J. R. PORTER.
CULTIVATOR.
APPLICATION FILED JULY 22, 1912.
1,153,952.
Patented Sept. 21, 1915.
4 SHEETS—SHEET 1.
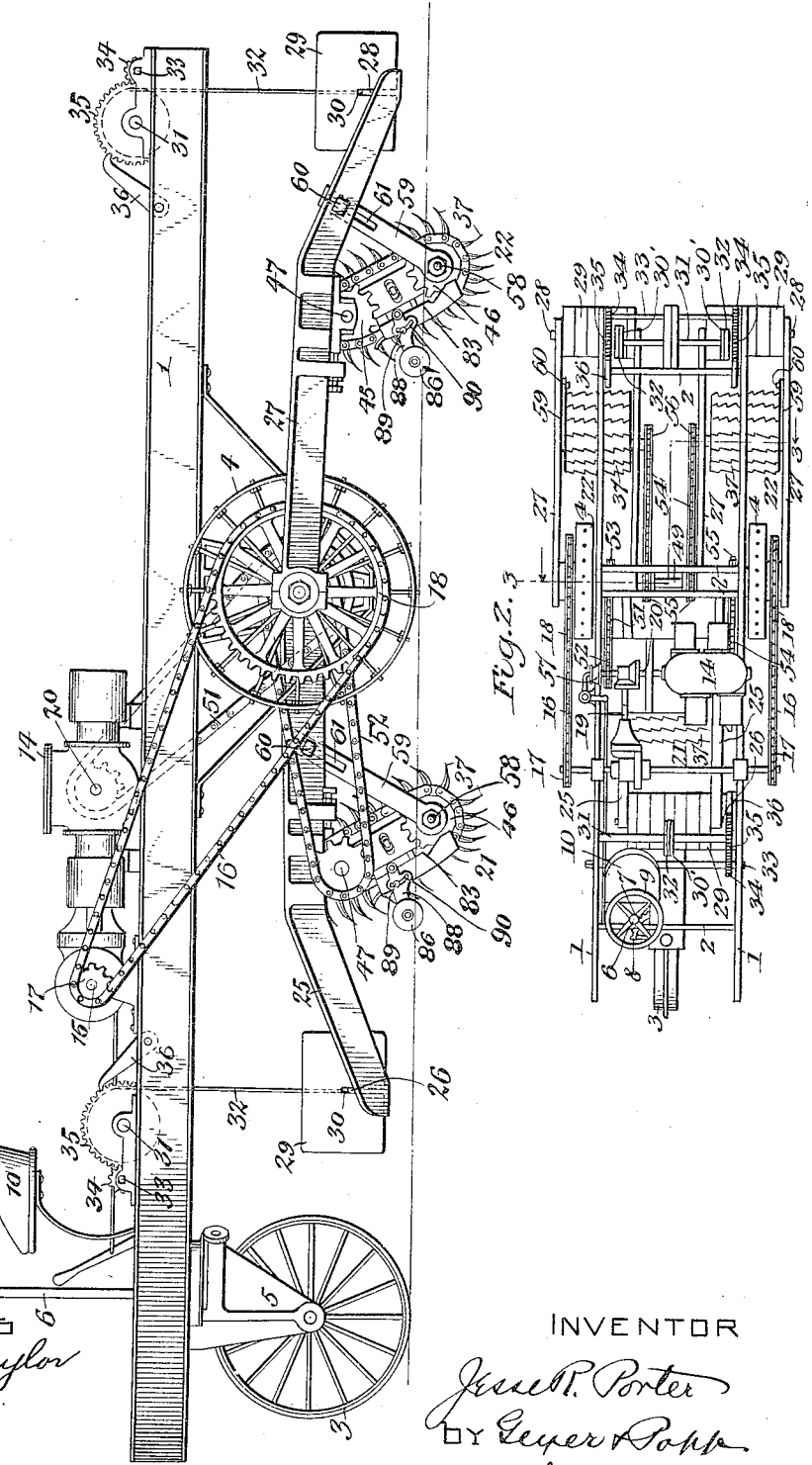
WITNESSES
W. Ray Taylor
Walter P. Geyer
INVENTOR
Jesse R. Porter
by Geyer & Popp
ATTORNEYS

J. R. PORTER.
CULTIVATOR.
APPLICATION FILED JULY 22, 1912.

1,153,952.

Patented Sept. 21, 1915.
4 SHEETS—SHEET 2.

WITNESSES
W. Ray Taylor
Walter P. Geyer

INVENTOR
Jesse R. Porter
by Geyer & Robb
ATTORNEYS

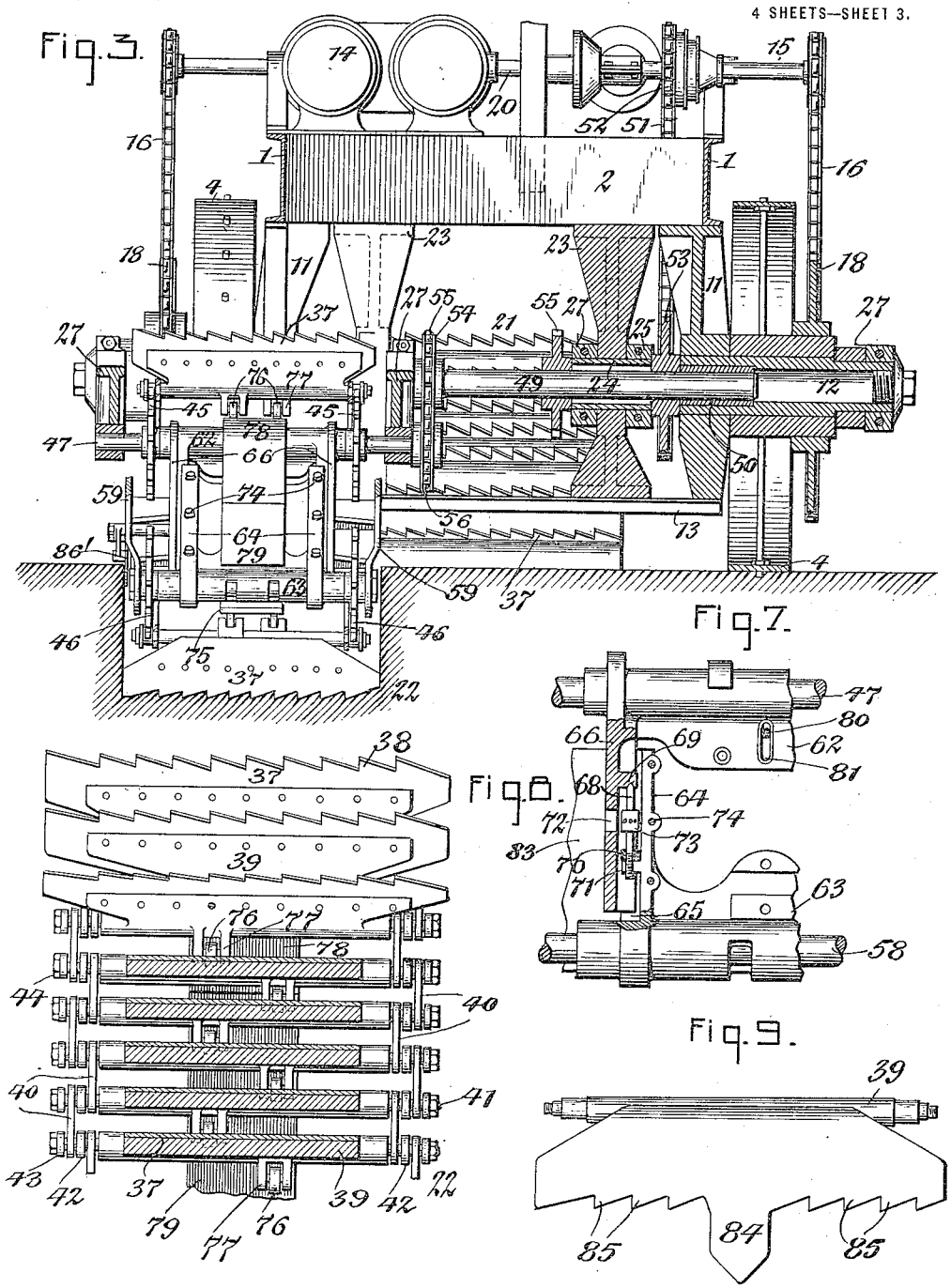

J. R. PORTER.
CULTIVATOR.
APPLICATION FILED JULY 22, 1912.

1,153,952. Patented Sept. 21, 1915.
4 SHEETS—SHEET 4.

WITNESSES
W. Ray Taylor
Walter P. Geyer

INVENTOR
Jesse R. Porter
BY Geyer & Popp
ATTORNEYS

UNITED STATES PATENT OFFICE.

JESSE R. PORTER, OF BUFFALO, NEW YORK.

CULTIVATOR.

1,153,952.  Specification of Letters Patent.  Patented Sept. 21, 1915.

Application filed July 22, 1912. Serial No. 710,743.

*To all whom it may concern:*

Be it known that I, JESSE R. PORTER, a citizen of the United States, residing at Buffalo, in the county of Erie and State of New York, have invented new and useful Improvements in Cultivators, of which the following is a specification.

This invention relates to a cultivator for digging and finely dividing or disintegrating the earth of a farm preparatory to planting seed in the same and more particularly to a machine for this purpose which is operated by power and designed to cover a comparatively large area during one run but which can also be operated by animal power and designed to cover a smaller area.

Figure 4:
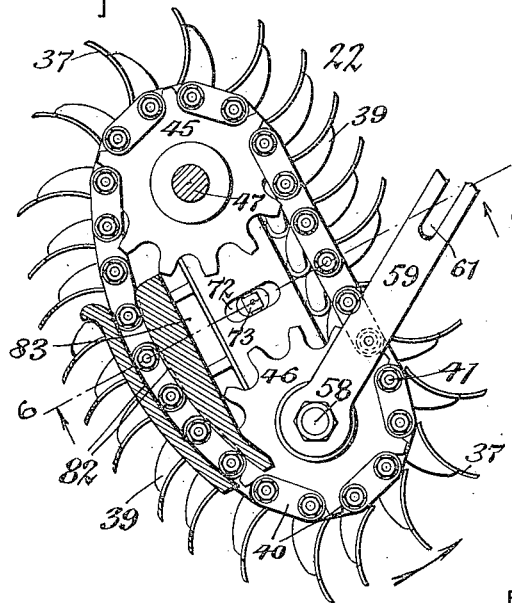
Figure 5:
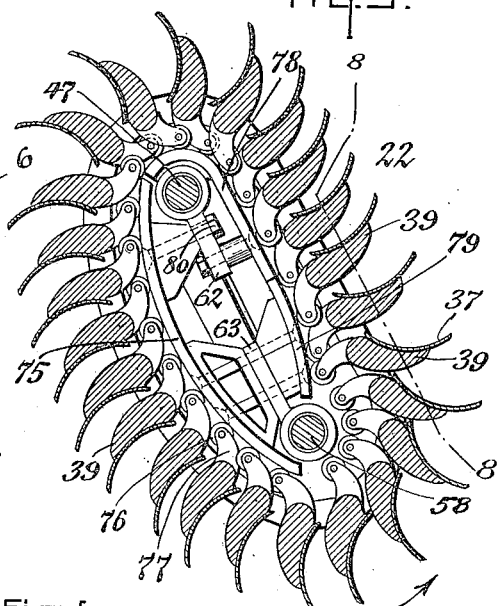
Figure 6:
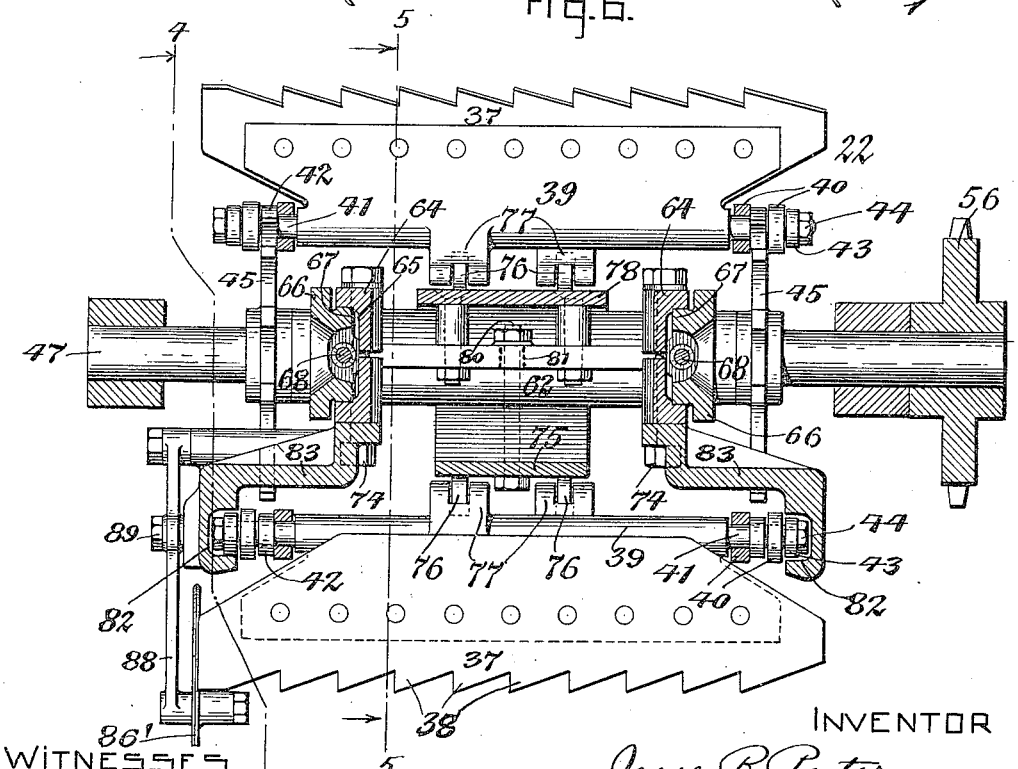

It is the object of this invention to produce a machine for this purpose which is comparatively simple and durable in construction and efficient in operation, which will thoroughly and effectually dig up the ground or earth and thoroughly pulverize or reduce the same suitable for planting, which can be regulated so as to dig the earth at variable depths best suited for the particular crop of planting desired, which permits of digging up a portion of the sub-soil at the same time that the surface soil is being dug up, and which is so organized that a comparatively large surface of the earth is operated upon at one time with a minimum expenditure of power. In the accompanying drawings consisting of 4 sheets: Figure 1 is a side elevation of a cultivator constructed in accordance with my invention. Fig. 2 is a top plan view thereof. Fig. 3 is a vertical transverse section, on an enlarged scale, taken in line 3—3, Fig. 2. Fig. 4 is a fragmentary side elevation of one of the digger sections, the same being shown partly in section, in line 4—4, Fig. 6. Fig. 5 is a vertical longitudinal section taken in line 5—5, Fig. 6. Fig. 6 is a horizontal cross section, on an enlarged scale, of a digger section taken in line 6—6, Fig. 4, looking upwardly. Fig. 7 is a fragmentary sectional view of the frame and adjacent parts of one of digger sections. Fig. 8 is a fragmentary longitudinal section, taken in line 8—8, Fig. 5. Fig. 9 is a detached view of one of the digging tools constructed somewhat differently from the tool shown in Figs. 2, 6 and 8 and designed for digging part of the sub-soil at the same time that the surface soil is being dug.

Similar characters of reference indicate corresponding parts throughout the several views.

Although the main frame of the machine which supports the various working parts may be variously constructed that shown in the drawings is suitable and comprises two longitudinal side sills, beams or bars 1 and a plurality of cross bars or pieces 2 which connect the sills at different points throughout the length thereof. At its front end this frame is preferably mounted upon a single wheel 3 which is capable of turning horizontally on the central part of the frame for steering purposes and about midway of the length of the frame the same is mounted upon two rear supporting wheels 4, 4 arranged along the outer sides of the sills. The parts just referred to constitute in effect the main elements of the carriage whereby the digging appliances are transported during the operation of cultivating the earth and also supporting the same for transportation from one field or place to another when the cultivator is not in use. The means for operating the front steering wheel which are shown in the drawings, as an example, comprise a fork 5 which is pivoted horizontally on the front part of the frame, and an upright steering post or shaft 6 also journaled on the frame and provided at its lower end with a pinion 7 which meshes with a gear segment 8 on the steering wheel and also provided with a hand wheel 9 for the use of the operator who may occupy a seat 10 on the adjacent part of the frame.

Various means may be employed for pivotally connecting each supporting wheel with the frame but those shown in the drawings are satisfactory and comprise two hangers or struts 11 depending from the central parts of the side sills, two tubular arms or quills 12 arranged horizontally and transversely in line and each projecting laterally outward from one of the main struts so as to form a short axle or axle arm upon which the hub of one of the supporting wheels is journaled, and a lower crossbar 13 connecting the lower ends of the main struts, as shown in Fig. 3. If desired the carriage may be propelled by animal power but in the drawings means are provided for propelling the same by means of a motor or engine 14 preferably of the explosion type, which is mounted upon the central part of the frame and operatively connected with the hubs of the two supporting and driving wheels 4 by a transmission mechanism. The latter preferably comprises a horizontal jack shaft 15 journaled transversely on the front part of the frame, a pair of chain belts 16 each of which passes around a sprocket pinion 17 on one end of the jack shaft and a sprocket wheel 18 on the outer end of the hub of one of the driving wheels, and a longitudinal shaft 19 connected at its opposite ends by suitable gearing with the jack shaft and the driving shaft 20 of the engine.

In the preferred form of this machine the digger mechanism of the same comprises three digger sections 21, 22, 22 which are adapted to dig three sections of a furrow side by side at a time, one of these digger sections 21 being preferably arranged centrally underneath the front part of the frame and in advance of the driving wheels while the remaining two sections 22, 22 are arranged transversely in line in rear of the driving wheels with an intervening space between the opposing ends of the rear digger sections which is lengthwise in line with the front digger section so that these three sections upon passing forwardly over the ground will produce a multiple furrow equal in width to the combined length of the three digger sections. Each of these digger sections is so mounted that the same can be raised and lowered for the purpose of varying the depth at which the ground is being tilled. The preferred means for this purpose comprise two inner or auxiliary hangers or struts 23 depending from the central part of the frame transversely in line with the outer or main hangers 11 and connected at their lower ends in the lower cross bar 13, two tubular arbors or supporting sleeves 24 arranged axially in line with each other and with the axle arms or quills of the supporting or driving wheels and each sleeve being secured in the central part of one of the inner hangers so that its opposite ends project beyond the inner and outer side of this hanger. A pair of longitudinal front supporting bars 25 are pivoted at their rear ends on the outer ends of the tubular sleeves or arbors 24 and adapted to support the front or central digger section 21 on the central parts thereof, and a cross bar 26 connects the front ends of these supporting bars. Two pairs of rear longitudinal supporting bars 27 are provided, the outer member of each rear pair being pivoted at its front end on the outer end of one of the rear axle arms or quills while the companion inner member is pivoted at its front end on the inner end of the adjacent tubular arbor 24, each rear pair of supporting bars being adapted to support one of the rear digger sections 22 on the central parts thereof, while a rear cross bar 28 connects the rear ends of each pair of rear adjusting bars. Each pair of longitudinal adjusting bars and the companion cross bar constitute the main elements of a vertically adjustable frame which supports one of the digger sections and the same is held in a depressed position so as to hold the digger section in engagement with the ground by means which preferably consist of a weight which is constructed in the form of sections 29 so that a greater or lesser number of the same may be mounted on the adjusting frame as best suits the particular soil which is being operated upon. As shown in the drawings, each of these weight sections is preferably mounted on its adjustable frame by providing the weight section on its underside with a vertical recess or notch 30 which is adapted to receive the upper edge of the cross bar of the respective adjusting frame, whereby these weight sections may be easily and conveniently removed from the adjusting frame or applied thereto to suit the character of the work in hand.

Means are provided for regulating the depth to which each digger section may enter the ground and also for raising the digger section clear of the ground when it is desired to transport the cultivator from place to place while the same is not in use. A suitable device for this purpose comprises a drum $30^1$ mounted on a horizontal transverse shaft 31 journaled in suitable bearings on the main frame, an adjusting cable, cord or chain 32 connected at its lower end with the cross bar of one of the adjusting frames and wound at its upper end around the drum $30^1$, an operating shaft 33 journaled in bearings on the main frame and having one of its ends squared or otherwise formed to receive a hand crank or other power appliance for turning the same, a pinion 34 mounted on the operating shaft and meshing with a gear wheel 35 on the drum shaft, and a detent pawl or dog 36 mounted on the main frame and engaging with the gear wheel 35, as shown in Figs. 1 and 2. Upon turning the power shaft in one direction or the other the adjusting cable will be either unwound or wound up on the drum and the digger section associated therewith will be raised of lowered accordingly and after the digger has assumed the desired position the same is held in place by means of the detent pawl engaging with the gear wheel.

Inasmuch as all of the digger sections are constructed alike the following detailed description of one will apply to all of them.

37 represents a plurality of tools, blades, bits, cutters or diggers each of which is preferably constructed of a sheet of steel which is curved vertically and is so mounted that upon engaging its outer or lower operative edge with the earth the concaved side of the same faces forwardly relatively to the direction of movement of the blade. As shown in Figs. 2 and 6 each of these cutter or digger blades has its outer or operative edge serrated or toothed and each tooth 38, as there shown, is preferably abrupt on one side and inclined on the other side, whereby the several teeth enter the earth gradually with a shearing action which enables the same to be driven and effect the digging operation with less power than if the cutting edge of the digger were straight or continuous. Furthermore, by thus constructing the digger blade with a plurality of teeth or serrations the earth is not only dug up and loosened but the same is also disintegrated or pulverized so that the soil is properly tilled and suitable for planting without necessitating subsequent use of a harrow or similar implement for this purpose. Each of these digging bits, blades or tools is mounted on the front side of a stock or supporting body 39 which is preferably constructed in the form of a horizontal bar which is arranged transversely in the machine. The several digger bars or stocks in each digger section are pivotally connected with one another so as to practically form an endless belt, chain or apron which is continuously rotated while the machine is in operation and moving over the ground so that the several digger blades are brought successively into engagement with the earth with a downward and rearward scooping action and the digging operation progresses as the machine advances. The preferred means for thus pivotally connecting the several digger bars or stocks which are shown in the drawings comprise a plurality of links 40 each of which is pivotally mounted at its opposite ends on reduced shanks 41 formed at the corresponding ends of two adjacent digger bars. Two series of such links are employed for connecting the opposite ends, respectively, of the several digger bars and the links of each series are staggered or offset alternately so as to permit each shank of a digger bar to receive the opposing ends of two connecting links, as shown in Fig. 8.

For purposes which will presently appear an antifriction roller 42 is mounted on the shank of each digger bar between the opposing ends of the two links which are mounted on the same and on the outer end of this shank is arranged a guide roller 43. The several links and rollers mounted on each shank may be confined thereon by any suitable means, for instance, by means of a retaining screw nut 44 which is screwed upon the outer threaded end of the respective shank.

The endless digging implement thus formed by the blades, bars and links is rotated rapidly in a vertical plane by passing the upper end of this endless belt around a pair of spaced upper or driving sprocket wheels 45 each of which engages with the antifriction rollers between the links at one end of the digger bars while the lower turn of this digger belt passes around two lower supporting sprocket wheels 46 each of which also engages its teeth with the rollers between the links at one end of said digger bars. The upper or driving sprocket wheels of the front digger section are mounted on a horizontal upper driven shaft 47 which is journaled in suitable bearings on the central parts of the side bars of the front adjusting frame, while the upper driving sprocket wheels of the rear digger sections are mounted respectively on upper horizontal driven shafts 47 each of which is journaled horizontally and transversely in suitable bearings on the central parts of the side bars of one of the rear adjusting frames. The driven shafts of the several digger sections are operated from the main shaft 20 of the engine or prime mover by means of a transverse horizontal counter shaft 49 extending axially through the tubular arbors 24 but not engaging therewith and journaled at opposite ends in bearings or bushings 50 arranged at the inner ends of the axial arms, a chain belt 51 passing around sprocket wheels 52, 53 mounted respectively on the engine shaft and the counter shaft and a plurality of chain belts 54 each of which passes around a sprocket wheel 55 on the counter shaft and a sprocket wheel 56 on one of the driven shafts corresponding to one of the digger sections. The connection and disconnection of the sprocket wheel 52 with the engine shaft may be effected by means of a clutch 57 of any suitable construction so that the rotation of the digger belts may be arrested when the machine is not in operation and the same is transported idly from one place to another.

The lower pair of sprocket wheels 46 supporting the lower turn of each digger belt is journaled loosely upon a horizontal transverse spindle 58 which latter is relatively stationary and supported at its opposite ends by means of adjusting hangers 59 each of which is pivotally connected at its lower end with one end of the supporting spindle while its upper end is adjustably connected with the respective side bar of the adjusting frame by means of a clamping bolt 60 passing through the last mentioned bar and a longitudinal slot 61 in the upper end of this adjusting hanger, as shown in Figs. 1 and 4. By raising and lowering the adjusting hangers the respective digger belt may be inclined at various angles relatively to the surface of the soil in order to obtain the best results of the digging tools on the ground under cultivation.

For the purpose of maintaining the upper sprocket wheels and the lower sprocket wheels of each digger belt at the proper distance apart a distance or radius frame is employed which pivotally connects the driven shaft and the supporting spindle of each digger belt. This radius frame is preferably so constructed that the supporting spindle can be adjusted relatively to the driven shaft for placing the proper tension on the digger belt and taking up any wear in the same. In the preferred form of this radius frame the same comprises an upper section 62 which is pivotally mounted on the driven shaft 47 between the upper sprocket wheels thereon and a lower section 63 which is secured to the spindle 58 between the loose sprocket wheels thereon. Although various means may be employed for adjustably connecting the upper and lower sections of the radius frame those shown in the drawings are suitable and preferred and comprise two upwardly projecting guide arms 64 formed on the lower section and each provided with a longitudinal groove 65 in its outer side and two downwardly projecting guide arms 66 formed on the upper section and each provided on its inner side with a longitudinal rib 67 engaging with the groove of the adjacent arm of the lower radius frame section. The two radius frame sections are separated for producing the proper tension upon the digger belt by means which comprise two adjusting rods 68 each of which is arranged lengthwise in a cavity formed in the guide rib of one of the upper guide arms and bears at its upper end against an abutment or shoulder 69 formed on this upper guide arm while its lower end is screw threaded and engages with a screw nut 70 which is mounted on an outwardly projecting lug 71 on the adjacent lower guide arm in such manner that the nut is prevented from turning. It follows from this construction that when the adjusting rod 68 is turned in the proper direction the two sections of the radius frame will be pushed apart, thereby tightening the digger belt as much as is necessary to cause the same to run freely without undue slack. The turning of the adjusting rod is preferably effected by means of a suitably constructed tool which may be passed through an opening 72 in the outer side of the upper guide arm and into engagement with one or the other of a series of radial openings formed in an enlargement or hub 73 on the central part of the adjusting rod, as shown in Figs. 4, 6 and 7. In order to hold the sections of the radius frame firmly in position after adjustment each of the lower guide arms is split lengthwise and the parts thereof on opposite sides of the split are connected by bolts 74. Preparatory to adjusting the sections of the radius frame relatively to each other the bolts 74 are loosened so as to permit the guide arms to slide freely relatively to each other and after adjustment these bolts are tightened so that the divided parts of each lower guide arm are clamped firmly against opposite sides of the guide rib of each upper guide arm.

As the digger blades move downwardly on the front or operative stretch of the digger belt the same are held firmly in a position in which they project laterally from the connecting links so as to produce the most effective digging or cutting action on the earth while moving downwardly relatively to the same and as these cutter blades move rearwardly around the lower turn of the digger belt their movement is so controlled that they rise from the earth with a feathering action so that they do not tend to throw the earth upwardly unduly but instead turn over the earth after loosening it and move the same rearwardly. This action of the digger blades or cutters is produced by means of a front controlling rail or track 75 arranged lengthwise adjacent to the inner side of the operative stretch of the digger belt and extending from the upper driven shaft to the lower supporting spindle thereof and engaged on its outer side by an antifriction roller 76 mounted on a controlling arm 77 projecting inwardly from the central part of each digger bar or stock, as shown in Figs. 5, 6 and 8. As each digger blade or cutter moves downwardly and rearwardly on the front or operative stretch of the digger belt the roller of its controlling arm runs along the outer side of the front controlling track and prevents the blade from turning backwardly upon engaging the earth but instead holds the same firmly in a laterally projecting position relatively to the connecting links so as to effectively engage the earth and carry the same rearwardly. The lower end of the controlling track terminates tangentially relatively to the circumference of the lower sprocket wheels and their supporting spindle whereby the controlling arm of each digger bar and its roller upon leaving the lower end of the front track causes the digger blade to move around the lower turn of the digger belt and rise from the ground with a feathering action so that the earth is not lifted unnecessarily but merely raised sufficient to turn the same and move it rearwardly.

In order to permit a comparatively large number of digger bars and blades to be employed to take fine cuts and arranged compactly without interference between their respective controlling arms the latter are staggered, as shown in Fig. 8. If the digger blades were permitted to tip up and assume a position parallel with the line of movement of the digger belt they would pass edgewise through the earth instead of sidewise with a scraping or hoeing action. This is prevented by the engagement of the roller on the controlling arm of each digger bar with the upper or inner edge of the next following digger bar, thereby always maintaining each digger or cutter blade in its operative position regardless of the character of the soil or other conditions. The front controlling track is preferably curved or dished forward slightly so that the cutters upon descending on the front or operative stretch of the digger belt move through a curved path are not under a load at this time and therefore no objectionable results occur.

While the digger blades are moving downwardly on the operative stretch of the digger belt it is necessary to maintain the controlling arms thereof in a definite relation relatively to the front controlling track in order to produce a proper digging action of the blades on the ground. Means must therefore be provided to prevent the front stretch of the digger belt from sagging and the controlling arms from dropping away from the front controlling track in the event of the digger belt stretching or becoming It is desirable, however, in farming, to dig up a part of the sub-soil of the earth and mix the same with the surface soil during each plowing operation in order to gradually deepen the seed bed.

In order to accomplish this the cutter blade or digger may be constructed, as shown in Fig. 9 with a central tooth 84 which is comparatively long and adapted to enter the sub-soil during the cultivating or plowing operation and a plurality of comparatively short teeth 85 arranged on opposite sides of the long tooth and adapted to engage only with the surface soil of the ground or earth which is being cultivated. By substituting this form of cutter blade or digger for the uniformly toothed blade shown in Fig. 6 the cultivator when operating upon the earth will dig up a portion of the sub-soil owing to its greater penetration and lift the same so that it becomes mixed with the previously cultivated surface soil, thereby gradually increasing the depth of the soil which is suitable for planting. Furthermore, by thus employing a sub-soil tooth on each blade in addition to the surface soil teeth which have less penetration a drainage groove or channel is cut at intervals in the sub-soil below the strata of surface soil which operates to drain the surplus moisture from the surface soil and maintain the same in the best condition for promoting the growth of the seed which has been planted in the same.

In order to cut the sod and roots in the earth in advance of the digging mechanism two colters 86 of wheel-shape are arranged on opposite sides of the front or central digger section and a single colter 86¹ is arranged on the outer side of each rear or side digger section, as shown in Figs. 1, 3 and 6. Each of these colters operates in the usual and well known manner and is supported for vertical adjustment by an arm 88 which has the colter pivoted on its front or lower end while its rear or upper end is pivoted on the bracket of the adjacent digger section, and a clamping bolt or screw 89 arranged on said bracket and passing through a segmental slot 90 in the colter arm.

I claim as my invention:

1. A cultivator comprising a carriage, and a digger mounted on said carriage and comprising an endless digging member, upper and lower wheels around which said digging member passes, a driving shaft connected with the upper wheels, a spindle supporting the lower wheels, a radius frame connecting the said shaft and spindle and having an upper section which is hung on said shaft and provided with ribbed guide arms, a lower section secured to the spindle and provided with grooved guide arms which receive the ribs of the upper arms, and means for adjusting the upper and lower arms relatively to each other comprising an adjusting rod engaging one end with one of said arms while its opposite end is provided with a screw thread, and a nut mounted on the other guide arm and receiving the threaded end of said rod, said grooved arm being split lengthwise and the parts thereof on opposite sides of the split being connected by clamping screws.

2. A cultivator comprising a carriage, and a digger mounted on said carriage and comprising a plurality of transverse digger bars, links connecting corresponding ends of the digger bars and forming with the latter an endless belt, upper and lower wheels around which said belt passes, a shaft secured to said upper wheels, a spindle supporting said lower wheels, means for operating said belt so that its operative bars move rearwardly, a radius frame connecting said shaft and spindle, and means for causing the digger bars to project laterally from said links during their downward and rearward movement and to retract during the initial part of the upward movement of the same.

3. A cultivator comprising a carriage, and a digger mounted on said carriage and comprising a plurality of transverse digger bars, links connecting corresponding ends of the digger bars and forming with the latter an endless belt, upper and lower wheels around which said belt passes, a shaft secured to said upper wheels, a spindle supporting said lower wheels, a radius frame connecting said shaft and spindle, means for operating said belt so as to move the operative bars rearwardly, and means for causing the digger bars to project laterally from said links comprising a controlling track mounted on the radius frame and arranged adjacent to the operative stretch of said belt and extending tangentially relatively to said spindle, and controlling arms arranged on the inner edges of said digger bars and engaging said controlling track, said track having a gap adjacent to the lower rear side of said spindle.

4. A cultivator comprising a carriage, and a digger mounted on said carriage and comprising a plurality of transverse digger bars, links connecting corresponding ends of the digger bars and forming with the latter an endless belt, upper and lower wheels around which said belt passes, a shaft secured to said upper wheels, a spindle supporting said lower wheels, a radius frame connecting said shaft and spindle, and means for causing digger bars and blades to project laterally from said links comprising controlling tracks arranged adjacent to the operative and inoperative stretches of said belt, and controlling arms arranged on the inner edges of said digger bars and adapted to engage said controlling tracks, said radius frame being constructed of upper and lower adjustably connected sections, said front controlling track being mounted on the lower section of the radius frame and said upper and lower rear controlling track sections being mounted respectively on the upper and lower sections of the radius frame.

Witness my hand this 19th day of July, 1912.

JESSE R. PORTER.

Witnesses:
ROBERT N. CUNDALL,
THEO. L. POPP.

Copies of this patent may be obtained for five cents each, by addressing the "Commissioner of Patents, Washington, D. C."